United States Patent [19]
Schmidt

[11] 3,715,087
[45] Feb. 6, 1973

[54] SHEET FILM STORAGE MAGAZINE
[75] Inventor: Gunter Schmidt, Malibu, Calif.
[73] Assignee: Production, Inc., Los Angeles, Calif.
[22] Filed: Feb. 18, 1971
[21] Appl. No.: 116,550

[52] U.S. Cl. ............................. 242/67.3 R, 242/71.7
[51] Int. Cl. .................................................. G03b 17/30
[58] Field of Search ...242/71.7, 55, 59, 67.3 R, 67.4; 200/61.41

[56] References Cited

UNITED STATES PATENTS

| | | | |
|---|---|---|---|
| 3,191,882 | 6/1965 | Riedel | 242/67.3 R |
| 1,460,435 | 7/1923 | Newman | 242/71.7 X |
| 3,590,182 | 6/1971 | Beckhardt | 200/61.41 |
| 2,282,117 | 5/1942 | Cassidy | 242/55 |

Primary Examiner—George F. Mautz
Assistant Examiner—Edward J. McCarthy
Attorney—Lindenberg, Freilich & Wasserman

[57] ABSTRACT

Apparatus particularly useful for facilitating the handling of X-ray film sheets in daylight. The apparatus includes an X-ray film sheet cassette adapted to cooperate with a cassette unloader for dispensing film sheets into a storage module. The storage module includes a light tight housing having a film access slot therein. A drum and spool are mounted within the housing for rotation about spaced parallel axes. A web of opaque material terminally secured to the drum and spool extends around an intermediate guide roller. A film sheet dispensed from the cassette into the unloader is directed by guide means therein onto the web within the storage module. A motor mounted on the unloader is coupled to a drive gear which operatively engages a pick-up gear coupled to the storage module drum. Actuation of the unloader is controlled by a sensor mounted adjacent the film sheet path so that as a film sheet moves through the unloader, the motor is actuated to rotate the drum to thus wind the web thereon with the film sheet being wound between the web turns. In this manner, a multitude of exposed but unprocessed film sheets of various sizes can be stored. The storage module is portable and can be moved out of cooperative relationship with the unloader in cooperation with an X-ray film sheet processor. A processor adaptor module at the processor carries a motor driving a gear engageable with a spool pick-up gear in the storage module. Energization of the processor adaptor motor winds the web back from the drum to the spool to thus dispense film sheets one at a time from the web into the processor entrance slot.

10 Claims, 3 Drawing Figures

INVENTOR
GUNTER SCHMIDT
BY
ATTORNEYS

INVENTOR
GUNTER SCHMIDT

3,715,087

SHEET FILM STORAGE MAGAZINE

BACKGROUND OF THE INVENTION

1. Field of the Invention

This invention relates generally to apparatus useful in the handling of film sheets and, more particularly, to apparatus for facilitating the daylight handling of X-ray film sheets of the type primarily used in medical applications.

2. Description of the Prior Art

U.S. Pat. application Ser. No. 52,848 filed July 7, 1970, discloses a handling system which enables X-ray film sheets to be loaded into cassettes in daylight without inadvertantly exposing the film sheets. The loaded cassettes are then used by a technician in a conventional manner to X-ray photograph patients by exposure to an X-ray source. After exposure the film sheets are transferred from the cassette to a processor for processing.

SUMMARY OF THE INVENTION

The present invention is directed to an improved film sheet handling system which enables film sheets of various sizes to be conveniently stored after exposure and prior to processing.

More particularly, in order to facilitate the handling of X-ray film sheets, apparatus is disclosed herein for unloading exposed film sheets from cassettes and for compactly and conveniently storing them in sequence under light tight conditions. The apparatus in accordance with the invention includes a film sheet storage module which enables a sequence of sheets of various sizes to be stored for later processing. The film sheet storage module in accordance with the preferred embodiment of the invention includes a light tight housing having a drum and spool mounted therein for rotation about spaced parallel axes. A web of opaque material is terminally secured between the drum and spool. A film sheet access slot is formed in the storage module housing so as to permit a film sheet dropped therethrough to be deposited onto the web. Sensor means are provided in a cooperating cassette unloader module to sense the entering film sheet in order to actuate a motor carried by the unloader to rotate the storage module drum to thus wind the web thereon and wrap the film sheet between web turns.

In accordance with a significant aspect of the present invention, the drum drive motor, preferably carried by the cassette unloader, is actuated for a duration which depends upon the length of the entering film sheet. That is, the leading edge of the entering film sheet energizes the motor and the sheet trailing edge deenergizes the motor. Preferably, in order to space the film sheets within the web roll, a time delay is introduced before the motor operation is terminated in response to sensing the trailing edge.

In accordance with a further aspect of the invention, the film sheet storage module is portable and can be selectively positioned in cooperation with either the cassette unloader to receive a film sheet dispensed from a cassette and in cooperation with a processor adaptor module for dispensing stored film sheets one at a time into a processor.

In accordance with a further aspect of the invention, drive motors are provided on both the cassette unloader and the processor adaptor for cooperating with the film sheet storage module to respectively drive the web in one direction to store film sheets and in a second direction to dispense film sheets.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
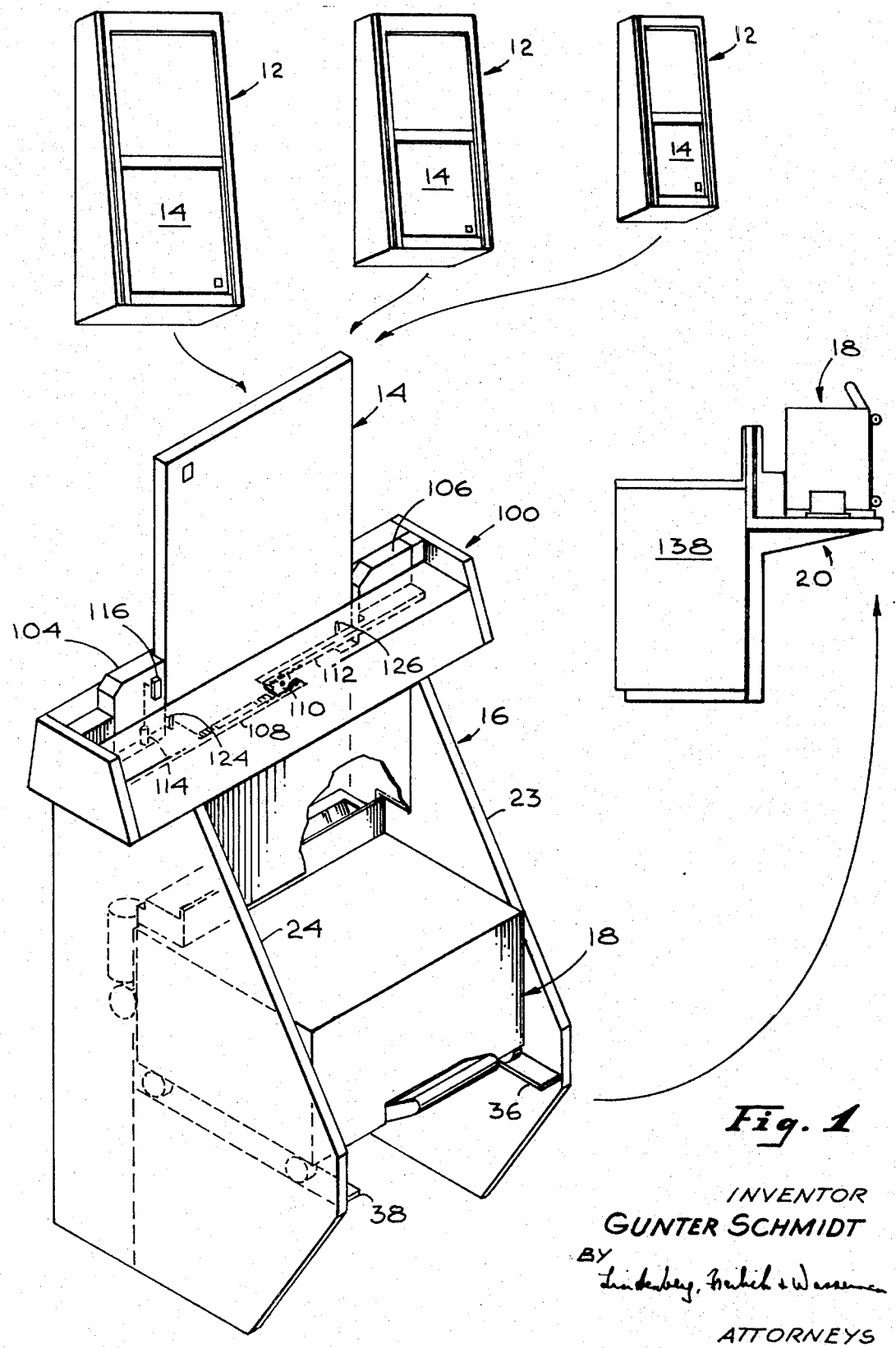
FIG. 1 is a perspective schematic illustration of a film handling system in accordance with the present invention.

Attention is now called to FIG. 1 of the drawing which diagrammatically illustrates a system in accordance with the present invention for facilitating the handling of X-ray film sheets in daylight. The system of FIG. 1 makes use of a film sheet dispenser 12 (disclosed in the afore-cited Pat. application Ser. No. 52,848) which can be operated so as to dispense X-ray film sheets, one at a time, into a cassette 14. After an X-ray film sheet has been loaded into the cassette 14, the cassette can be utilized, as in medical applications, in a conventional manner by a technician to X-ray photograph a portion of a patient's anatomy.

A system in accordance with the present invention, as shown in FIG. 1, is useful generally for facilitating the handling of exposed but unprocessed X-ray film sheets and finds particular utility in large medical facilities where many X-ray photographs of different sizes may be taken and in which it is desired to conveniently store those photographs for a short time for later processing. The various size dispensers 12 shown in FIG. 1 are illustrated to demonstrate the utility of the present invention for handling many different size X-ray photographs.

As shown in FIG. 1, the handling system in accordance with the present invention consists of three major parts including a cassette unloader module 16, a film sheet storage module 18, and a processor adapter module 20. The cassette unloader module 16 is utilized to unload a film sheet from a cassette 14 and to direct the film sheet into an access slot formed within the housing of the film storage module 18. The film storage module 18 fits within a compartment within the cassette unloader 16.

As will be seen hereinafter, the film storage module 18 includes a spool and a drum mounted within the module 18 for rotation about spaced parallel axes. An opaque web considerably longer than the spacing between the spool and drum axes is terminally secured to the spool and drum so as to enable it to be wound from one to the other. A film sheet dispensed from a cassette 14 into the film sheet storage module 18 is guided onto the web so as to enable the film sheet to be wrapped between web turns as the drum is rotated to wind the web thereon. The web is driven by a motor and gear carried by the cassette unloader 16 and engaged with a gear coupled to the drum within the module 18.

After the desired number of film sheets have been wrapped in the opaque web within the film storage module 18, the entire module 18 can be removed from the module compartment in the cassette unloader 16 and then placed in cooperative relationship with the processor adaptor means 20. The adaptor 20 includes a motor and gear for driving the web in a direction to unwind it from the drum to thus dispense the stored film sheets one at a time through the storage module access slot. When the storage module 18 is cooperatively supported on the adaptor 20, the module access slot is aligned with a processor entrance slot so that the film sheets from the storage module 18 are dispensed one at a time into a processor.

Figure 2:
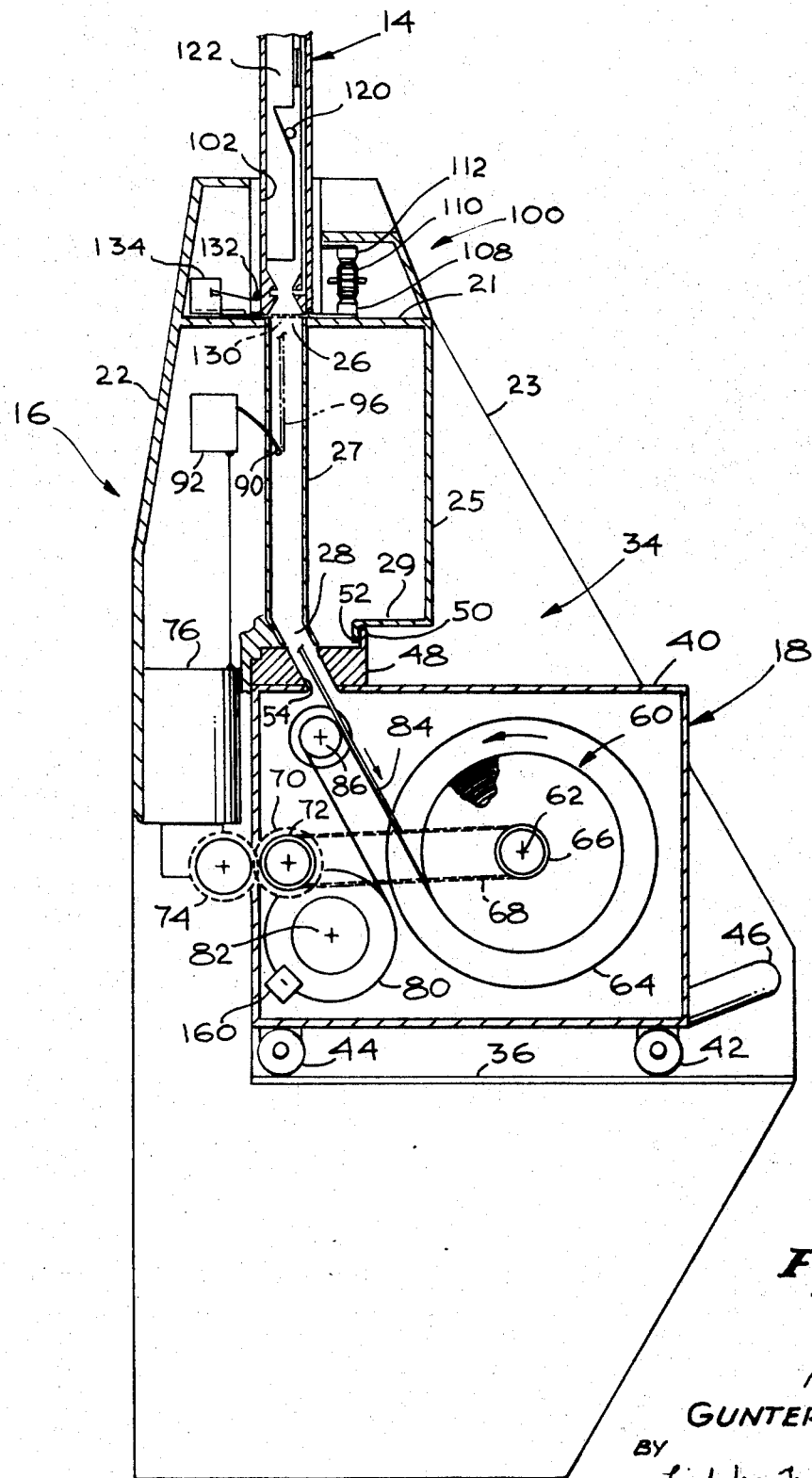
FIG. 2 is a sectional view illustrating the cassette unloader and film sheet storage module in operative relationship.

Attention is now called to FIG. 2 which illustrates the film storage module 18 and cassette unloader 16 in operative relationship for storing film sheets within the module 18. The cassette unloader 16 includes a housing having a top wall 21, a rear wall 22, and a pair of side walls 23 and 24. A partition 25 extends downwardly from the front of the top wall 21 between the side walls 23 and 24. An entrance slot 26 is defined in the top wall 21 and communicates with a film sheet chute 27 which terminates in an exit opening 28 formed in a partition 29 which projects rearwardly from the lower edge of partition 25.

The chute exit opening 28 opens into a film storage module compartment 34 formed between the unloader side walls 23 and 24. The compartment 34 is defined between the partition 29 and a pair of rails 36 and 38 supported on the inner surfaces of the walls 23 and 24 respectively. The compartment 34 is adapted to receive the film storage module 18.

More particularly, the film storage module 18 comprises a substantially rectangular light tight housing 40 having pairs of front and rear rollers 42 and 44 mounted on the underside thereof. In addition, the film storage module 18 is provided with a handle 46 for facilitating the physical carrying and placement of the storage module 18 within the compartment 34 with the rollers 42 and 44 mounted on the rails 36 and 38.

Further, the storage module 18 is provided with a positioning block extending therefrom which has a lip 50 adapted to abut against a shoulder 52 formed in the partition 29 of the unloader 16. The positioning block 48 defines an access slot 54 extending therethrough.

In order to use the storage module 18 with the unloader 16, the rear wheels 44 are placed on the forward ends of the rails 36 and 38 and the storage module 18 is then rolled rearwardly along the rails into the compartment 34 until the positioning block lip 50 engages the shoulder 52. This action will align the access opening 54 with the chute exit opening 28.

Mounted for rotation within the storage module 18 housing is a drum 60 having a central shaft 62. Enlarged terminal flanges 64 are mounted on the drum shaft 62. As illustrated, the drum shaft 60 is journalled for rotation within the side walls of the film storage module housing. A pulley 66 is fixedly secured to the drum shaft 62 and coupled by a belt 68 to a pulley 70 fixedly secured to a pickup gear 72 and mounted for rotation between the side walls of the storage module housing.

When the storage module 18 is properly positioned within the compartment 34 with the lip 50 engaged with the shoulder 52, the pickup gear 72 will mesh with a drive gear 74 driven by a motor 76 mounted on the rear wall 22 of the unloader 16. Activation of the motor 76 will thus drive the gear 74 to in turn drive the pickup gear 72 to thereby rotate the belt 68 and in turn drive the drum shaft 62.

In addition to the drum 60, a spool 80 having a spool shaft 82 is mounted within the storage module for rotation about the axis parallel to the axis of drum shaft 62.

An opaque web 84, considerably longer than the spacing between the drum shaft 62 and spool shaft 82 is terminally secured to the drum and spool shaft. The web 84 extends around an intermediate guide roller 86 mounted for rotation about an axis extending parallel to the axes of drum 60 and spool 80 but out of the plane defined thereby. As shown in FIG. 2, inasmuch as the web 84 has a length considerably greater than the spacing between the spool and drum shaft, the web can be wound through many turns around either the drum or spool.

The access slot 54 extending through the positioning block 48 opens into the storage module housing close to the intermediate roller 86 but on the drum side thereof. As a consequence, by rotating the drum 60 in a counterclockwise direction, as shown in FIG. 2, a film sheet falling through the access slot 54 will fall onto the web 84 and be wound around the drum shaft between turns of the web 84.

In order to assure that each film sheet entering the access slot is completely wound around the drum within the web 84 but without wasting web length, a switch 90 is provided within the film sheet chute 27 in the unloader 16. The switch 90 senses the leading and trailing edges of a film sheet falling through the chute 27. That is, the switch closes in response to the leading edge of a film sheet and opens after the trailing edge moves therepast. The switch 90 controls energization of the drive motor 76 through time delay circuitry 92 which is provided to introduce a short time delay, e.g., 0.1 seconds between sensing the film sheet leading edge and the energization of the motor 76. Additionally, a different and greater time delay is preferably introduced by the circuit means 92 after the switch 90 opens in response to sensing the film sheet trailing edge in order to assure a certain amount of web length between successive film sheets wrapped within the web around the drum.

Thus far it has merely been assumed that a film sheet 96 is dropped from a cassette 14 through the entrance slot 26 of the unloader into the chute 27. In actuality, it is, of course necessary to transfer the film sheet from the cassette 14 to the chute 27 in a light shielded manner. Additionally, it is desirable that the unloader accommodate different size cassettes respectively carrying different size film sheets. In order to achieve the foregoing objectives, a variable width entrance opening assembly 100 is provided for mounting on the top wall 21 of the unloader. The assembly 100 is provided with a vertical passageway 102 having a depth dimension slightly greater than the depth of the cassette 14. The assembly 100 is mounted securely on the top wall 21 with the passageway 102 aligned with the chute entrance slot 26. In order to accommodate cassettes of different widths, a pair of blocks 104 and 106 are mounted in the assembly 100, within the passageway 102, for movement toward and away from one another. More particularly, the blocks 104 and 106 are mounted for sliding movement along tracks (not shown) toward and away from one another within the passageway 102. The block 104 has a rack 108 affixed thereto which engages the lower periphery of pinion 110. The block 106 has a rack 112 secured thereto which engages the upper periphery of pinion 110. Thus, as either of the blocks is moved toward the vertical center line of the slot 102, its rack will rotate the pinion 110 to thereby move the other rack in the opposite direction, i.e., also towards the vertical center line. Conversely, of course, if either of the blocks is moved outwardly from the vertical center line of the slot 102, it will rotate the pinion 110 in a direction to correspondingly move the other block outwardly from the center line.

Apparatus in accordance with the invention is intended for use with film sheets of perhaps three or four different widths and accordingly, it is necessary that the assembly 100 accommodate a corresponding number of different width cassettes. For this purpose, the block 104 is preferably provided with a bolt 114 adapted to selectively project into positioning holes (not shown) defined within the track along which the block 104 slides. More particularly, bolt 114 is preferably spring urged downwardly so that it will fall into a positioning hole as the block 104 is moved. By pressing the push button 116, the bolt 114 will be withdrawn from the positioning hole to enable the block 104 to be repositioned. The positioning holes are of course located within the block tracks so as to lock the block 104 into any one of the positions required to accommodate the varying width cassette sizes.

Preferably, the cassette 14 and assembly 100 are cooperatively constructed so as to cause a film sheet within the cassette to be automatically released as a consequence of insertion into the passageway 102 of the assembly 100. More particularly, as is disclosed in the aforesaid Pat. application Ser. No. 52,848, the cassette is preferably comprised of a pair of plates normally urged together by springs. One of the plates is provided with studs 120 which ride on ramp portions of spacer plates 122 mounted for sliding within channels in the cassette housing. When the cassette is inserted into the passageway 102 of the assembly 100, pins 124 and 126, respectively, provided on the blocks 104 and 106 within the passageway 102, project into the cassette housing channels to engage and slide the spacer plates 122 upwardly. The sliding action causes the studs 120 to ride up the spacer plate ramp to thus space the cassette plates from one another. As a consequence, a film sheet held between the cassette plates will fall out of the cassette and through the entrance slot 26. Thereafter it will be guided by the chute 27 and access slot 54 through the block 48 onto the web 84 of the storage module 18.

In addition to the forgoing, it is preferable to provide a slidable light shield 130 within the assembly 100 to prevent light from entering the entrance slot 26 in the absence of a cassette 14 within the passageway 102. When the cassette 14 is inserted into passageway 102 a microswitch 132 is closed to energize a solenoid 134 to move the light shield 130 so as to provide free access between the passageway 102 and chute 27.

From the foregoing, the manner of unloading film sheets from cassettes 14, through the unloader, into a film sheet storage module 18 should now be apparent. The module 18 enables a great many film sheets of various sizes to be compactly and conveniently stored in sequence.

After the film sheet storage module 18 has been loaded with a sufficient number of film sheets, it can be moved out of the cassette unloader module compartment 34 into operative relationship with the previously mentioned processor adaptor 20.

Figure 3:
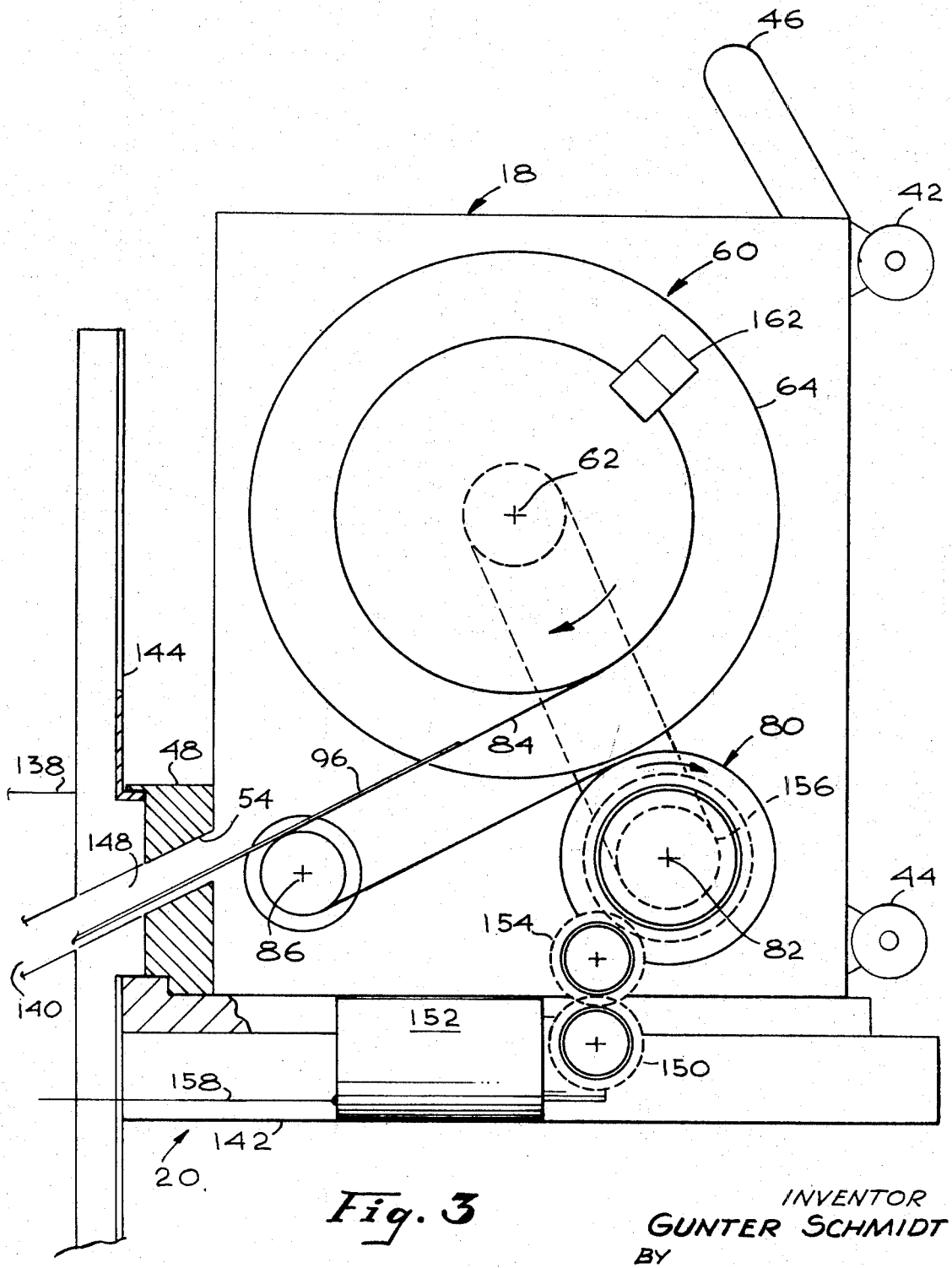
FIG. 3 is a sectional view illustrating the film sheet storage module and processor adaptor in operative relationship.

Attention is now called to FIG. 3 which illustrates the processor adaptor 20 mounted adjacent to the entrance slot 140 of a conventional processor such as a PAKO processor (e.g., PAKOROL XU). The previously mentioned handle 46 facilitates movement of the storage module 18 from the cassette unloader 16 to the adaptor 20. Whereas the storage module 18 is oriented horizontally with the access slot 54 in the top surface when employed in operative relationship with the cassette unloader as shown in FIG. 2, it is oriented vertically as shown in FIG. 3 when used in conjunction with the adaptor 20 to dispense stored film sheets into the processor.

More particularly, the adaptor 20 is comprised of an essentially L-shaped frame including a horizontally oriented member 142 for supporting the storage module 18 and a vertically oriented member 144 for bearing against the processor housing. The frame member 144 defines a guide chute 148 in alignment with the processor entrance opening 140.

It will be apparent that in order to dispense stored film sheets from the storage module 18, the web 84 must be driven in a direction opposite to that in which the film sheets were stored. That is, as shown in FIG. 3, the web must be pulled from the drum 60 so as to rotate the drum in a clockwise direction. This is accomplished by a spool drive gear 150 secured to the shaft of a motor 152 mounted on the adaptor 20. The spool drive gear 150 engages a spool pickup gear 154 which in turn drives gear 156 fixedly secured to the spool shaft 82.

Most state of the art X-ray film processors are provided with a control unit (not shown) which supplies a signal to an indicator to indicate to an operator when the processor is ready to receive an additional film sheet for processing. In accordance with the invention, this signal provided by the control unit is coupled via line 158 to the motor 152. Thus, whenever the processor 138 is ready to accept a new film sheet, a signal sent to the motor 152 to cause it to rotate the spool drive gear 150 to in turn rotate the spool 180 in a clockwise direction to thus pull the web 84 from the drum 60. As shown in FIG. 3, this action dispenses the film sheet 96 through the slot 54 of the module positioning block 48 and into the processor entrance slot 140.

In order to assure that the web is maintained taut both during storage and dispensing, one way clutches are coupled to both the drum and spool. More particularly, during storage when the drum is driven counterclockwise, a clutch 160 acts on the spool to create a drag force to thus maintain the web 84 taut. On the other hand, during dispensing when the spool is being driven clockwise as shown in FIG. 3, a clutch 162 acts on the drum to create a drag force.

From the foregoing, it will be appreciated that a system has been disclosed herein for facilitating the daylight handling of X-ray film sheets. More particularly, a system in accordance with the preferred embodiment of the invention includes a cassette unloader module which functions to unload film sheets from cassettes into a film storage module for compact and convenient storage prior to processing. Although in the preferred embodiment of the invention, the film storage module 18 is utilized in conjunction with the cassette unloader 16 and processor adaptor 20, it should be recognized that the film storage module will find utility in other film handling systems, as for example, where it is utilized in conjunction with a manual loader as an intermediate store for films prior to taking the films to a darkroom for conventional processing.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus useful in combination with X-ray film sheet cassettes for unloading film sheets therefrom and for storing said sheets for later processing, said apparatus including:
   cassette unloader means including a housing defining film sheet entrance and exit openings and having guide means adapted to position a cassette in alignment and light tight relationship with said entrance opening;
   a film sheet storage module including a light tight housing having an access slot formed therein;
   said cassette unloader means including a module compartment for receiving said film sheet storage module with the module access slot aligned and in light tight relationship with said unloader means exit opening;
   a spool having an axis mounted in said storage module housing, spaced in a first direction from said access slot, for rotation about said axis;
   a drum having an axis mounted in said storage module housing, spaced in a second direction from said access slot, for rotation about said axis;
   an opaque web terminally secured to said spool and said drum and having a length considerably greater than the spacing between said spool and drum whereby said web can be wound around said spool and said drum;
   drive means mounted on said cassette unloader means; and
   pickup means disposed in said film sheet storage module positioned to engage said drive means when said module is received in said module compartment for transferring portions of said web between said spool and drum.

2. The apparatus of claim 1 wherein said drive means includes a motor mounted on said cassette unloader means housing and
   a drum drive gear coupled to said motor mounted in said module compartment; and wherein said pickup means comprises
   a drum pickup gear coupled to said drum for operatively engaging said drum drive gear when said storage module is received in said module compartment.

3. The apparatus of claim 2 including sensor means carried by said cassette unloader means for sensing the movement of a film sheet between said entrance and exit opening; and
   means responsive to said sensor means for controlling said cassette unloader motor.

4. The apparatus of claim 3 wherein said means responsive to said sensor means includes means for energizing said cassette unloader motor after a first delay period subsequent to the sensing of a film sheet leading edge and for deenergizing said motor after a second delay period subsequent to the sensing of a film sheet trailing edge.

5. The apparatus of claim 2 including:
   a processor having a film sheet entrance slot;
   adaptor means for supporting said storage module adjacent to said processor with said storage module access slot aligned with said processor entrance slot;
   a motor mounted on said adaptor means;
   a spool drive gear coupled to said adaptor means motor; and
   a spool pickup gear coupled to said spool for operatively engaging said spool drive gear when said storage module is supported by said adaptor means.

6. The apparatus of claim 5 wherein said processor includes a control means for indicating when said processor is ready to accept a film sheet for processing; and
   means coupling said control means to said adaptor means motor.

7. The apparatus of claim 1 including means for adjusting the width of said cassette unloader means housing entrance opening.

8. The apparatus of claim 1 including means mounted on said cassette unloader means for acting on a cassette when the cassette is engaged with said guide means for causing said cassette to release a film sheet into said entrance opening.

9. Apparatus useful in combination with X-ray film sheet cassettes for unloading film sheets therefrom and for storing said sheets for later processing, said apparatus including:
   a housing defining a film sheet entrance opening and having guide means adapted to position a cassette in alignment and light tight relationship with said entrance opening;
   a spool having an axis mounted in said housing, spaced in a first direction from said entrance opening, for rotation about said axis;
   a drum having an axis mounted in said housing, spaced in a second direction from said entrance opening, for rotation about said axis;
   an opaque web terminally secured to said spool and said drum having a length considerably greater than the spacing between said spool and drum whereby said web can be wound around said spool and said drum;
   drive means coupled to said spool and drum for transferring portions of said web therebetween; and means mounted on said housing for acting on a cassette when the cassette is engaged with said guide means for causing said cassette to release a film sheet into said entrance opening.

10. The apparatus of claim 9 including sensor means mounted on said housing for sensing the movement of a film sheet past said entrance opening; and means responsive to said sensor means for controlling said drive means.

* * * * *